(12) United States Patent
Haub

(10) Patent No.: US 7,798,716 B2
(45) Date of Patent: Sep. 21, 2010

(54) LINEAR DEVICE WITH IMPROVED LEAKAGE-PREVENTING END-PLATE UNIT

(75) Inventor: Alfred Haub, Luelsfeld (DE)

(73) Assignee: Rexroth Star GmbH, Schweinfurt (DE)

( * ) Notice: Subject to any disclaimer, the term of this patent is extended or adjusted under 35 U.S.C. 154(b) by 1108 days.

(21) Appl. No.: 11/190,616

(22) Filed: Jul. 27, 2005

(65) Prior Publication Data

US 2006/0023978 A1 Feb. 2, 2006

(30) Foreign Application Priority Data

Jul. 28, 2004 (DE) .................. 10 2004 036 529

(51) Int. Cl.
*F16C 33/10* (2006.01)
(52) U.S. Cl. .......................... 384/13; 384/43
(58) Field of Classification Search .............. 74/89.32, 74/89.33; 384/13, 15, 43, 49; 184/5
See application file for complete search history.

(56) References Cited

U.S. PATENT DOCUMENTS

| | | | |
|---|---|---|---|
| 4,850,720 A | 7/1989 | Osawa | |
| 5,139,347 A | 8/1992 | Hattori | |
| 5,399,023 A | 3/1995 | Winkelmann et al. | |
| 6,024,490 A | 2/2000 | Shirai | |
| 6,155,717 A | 12/2000 | Michioka et al. | |
| 6,190,046 B1 | 2/2001 | Agari | |
| 6,203,199 B1 * | 3/2001 | Pfeuffer | 384/45 |
| 2002/0020238 A1 * | 2/2002 | Takahashi et al. | 74/424.71 |
| 2004/0076349 A1 * | 4/2004 | Fujimura | 384/43 |
| 2004/0131288 A1 | 7/2004 | Kano | |

FOREIGN PATENT DOCUMENTS

| | | |
|---|---|---|
| DE | 41 41 038 | 6/1993 |
| DE | 198 28 587 A1 | 1/1999 |
| DE | 198 30 140 | 1/2000 |
| DE | 199 54 387 A1 | 5/2001 |
| EP | 471340 A2 * | 2/1992 |
| EP | 608832 A2 * | 8/1994 |
| EP | 0 874 172 A1 | 10/1998 |
| EP | 0 919 738 A1 | 6/1999 |
| EP | 1 416 178 A1 | 5/2004 |
| JP | 10184683 A | 7/1998 |
| JP | 11022726 A | 1/1999 |
| JP | 2004144266 A | 5/2004 |

* cited by examiner

*Primary Examiner*—Richard W Ridley
*Assistant Examiner*—Alan B Waits
(74) *Attorney, Agent, or Firm*—Michael J. Striker

(57) ABSTRACT

A linear device has an essentially rod-shaped functional unit and a functional unit that at least partially encompasses the rod-shaped functional unit and includes a main body and at least one end plate unit that rests with a contact surface against the main body in which a lubrication groove is provided, which is open toward the contact surface and extends at least partially in the circumference direction around the rod-shaped functional unit, and it is possible to fasten the end plate unit to the main body by only two fastening elements, and a region of the contact surface adjacent to the lubrication groove and encompassing this lubrication groove is raised in relation to the rest of the contact surface.

31 Claims, 5 Drawing Sheets

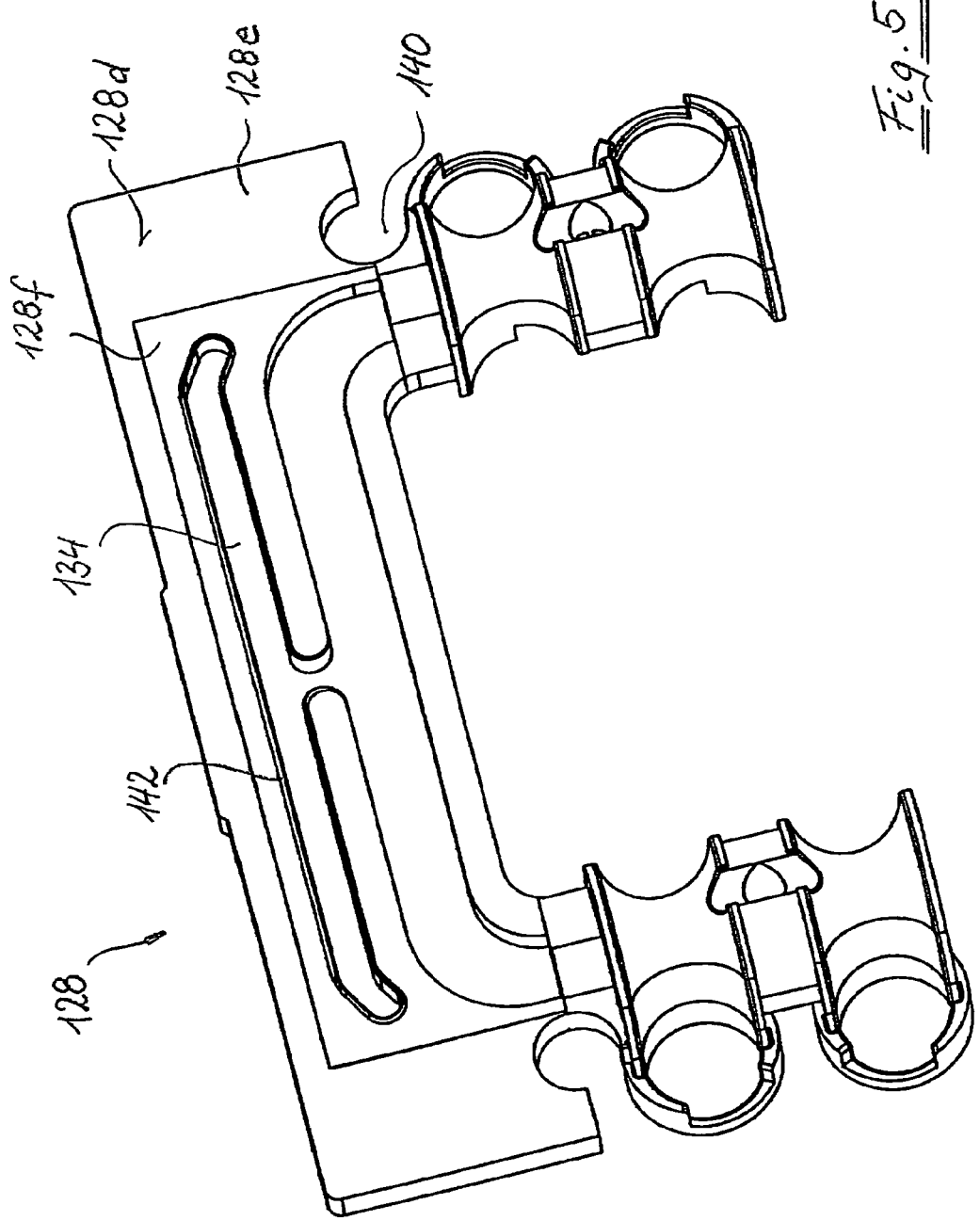

LINEAR DEVICE WITH IMPROVED LEAKAGE-PREVENTING END-PLATE UNIT

BACKGROUND OF THE INVENTION

The present invention relates to a linear device.

More particularly, it relates to a linear device which has a first, essentially rod-shaped functional unit and a second functional unit that at least partially encompasses the rod-shaped functional unit; and are able to move in relation to each other by means of at least one endless rolling element track, which includes a load-bearing rolling element channel segment, a return channel segment, and two deflecting channel segments that connect the load-bearing rolling element channel segment and the return channel segment to each other; the second functional unit has a main body and at least one end plate unit, which rests with a contact surface against an end surface of the main body and contains a deflecting channel segment of the rolling element track; and a lubrication groove, which is open toward the contact surface and extends at least partially in the circumference direction around the rod-shaped functional unit, is provided in the end plate unit.

Although the present invention is described below mainly in connection with the example of a linear guide device with a guide rail as the rod-shaped functional unit and a guide carriage as the functional unit that at least partially encompasses the guide rail, it should be noted at this point that the present invention can also be advantageously used in other types of linear devices such as rolling element bushing guides, in particular ball bushing guides, spline shaft guides (also often referred to in the trade as "ball splines"), or linear drive units such as rolling element linear drives, in particular ball-type linear drives.

The at least one end plate unit is usually attached to the main body with screws. It can, however, also be attached to the main body by means of detent elements.

Usually, the at least one end plate unit is provided with a lubricant supply connection in order to be able to supply lubricant to the rolling elements contained in the at least one rolling element track. The prior art has already proposed numerous designs for preventing lubricant from coming out of the lubrication groove, which is open toward the contact surface of the end plate unit against the main body, and escaping between the main body and the end plate unit.

One design known from U.S. Pat. No. 4,850,720, has proposed providing sealing lips, which protrude slightly from the contact surface of the end plate unit immediately adjacent to the lubrication groove. In the linear device known from U.S. Pat. No. 5,139,347, corresponding sealing lips are provided at the edge of the end plate unit.

By contrast, EP 1 416 178 A2, which defines the species, has proposed embodying the entire contact surface of the end plate unit against the main body as a domed surface and attaching the end plate unit to the main body by means of four fastening screws situated in the corners of the contact surface. EP 1 416 178 A2 is based on a prior art in which the end plate unit was attached to the main body by means of only two fastening elements, which made it impossible to prevent a gap formation between the end plate unit and the main body and the attendant danger of an undesired escape of lubricant between the end plate unit and main body. The desired sealing action could only be reliably assured through the domed embodiment of the contact surface and the use of four fastening screws, i.e. the embodiment according to EP 1 416 178 A2.

SUMMARY OF THE INVENTION

Accordingly, it is an object of the present invention to provide a linear device, which avoids the disadvantages of the prior art.

In keeping with these objects and with others which will become apparent hereinafter, one feature of the present invention resides, briefly stated, in a linear device, comprising a first substantially rod-shaped functional unit; a sectional functional unit that at least partially encompasses said first functional unit, said functional units being movable relative to one another; at least one endless rolling element track for moving said functional units relative to one another, said at least one endless rolling element track including a load-bearing rolling element channel segment, a return channel segment, and two deflecting channel segments that connect said load-bearing rolling element channel segment and said return channel segment to each other, said second functional unit having a main body and at least one end plate unit which rests with a contact surface against an end surface of said main body and contains one of said deflecting channel segments of said rolling element track, said end plate unit being provided with a lubrication groove which is open toward said contact surface and extends at least partially in a circumferential direction around said first functional unit, said end plate unit being fastenable to said main body by only two fastening elements, and a region of said contact surface adjacent to said lubrication groove and encompassing said lubrication groove being raised in relation to a rest of said contact surface.

The linear device which is designed in accordance with the present invention has reduced the occurrence of this technical defect clearly formulated in EP 1 416 178 A2, with the aim of facilitating attachment of the end plate unit to the main body, without simultaneously reducing the reliability of this attachment with regard to an undesired escape of lubricant between the end plate unit and main body. According to this design, it is no longer necessary for the entire contact surface to be embodied as curved; it is sufficient merely to embody a region of the contact surface adjacent to the lubrication groove and encompassing this lubrication groove as raised in relation to the rest of the contact surface and to fasten the end plate unit to the main body by means of only two fastening elements.

The end plate unit can advantageously be comprised of a base part and an insert part that includes the contact surface, the insert part being comprised of a softer material, in particular a softer plastic, than the base part. For example, the base part can be made of POM (polyoxymethylene) and the insert part can be made of Hytrel. Since the insert part is comprised of a softer material than the base part, it can easily be compressed between the base part and the main body during attachment of the end plate unit to the main body, which makes it possible to improve the sealing action.

In addition or alternatively, the sealing action can also be improved if the lubrication groove is at least partially surrounded by a sealing lip. Since the compression action exerted by the two fastening elements decreases as the distance from the fastening elements increases, it is also possible for the height of the sealing lip above the raised region to extend in a generally convex fashion in a direction essentially parallel to the connecting line between the fastening elements.

Based on similar considerations, it is also possible for the distance of the raised region from the rest of the contact surface to extend in a generally convex fashion in a direction extending from the connecting line between the fastening elements to the edge of the end plate, preferably orthogonal to the connecting line and/or for the raised region to extend in a generally convex fashion in a direction essentially parallel to the connecting line between the fastening elements.

It is in fact fundamentally possible for the raised region to be attached to or transition into the rest of the contact surface along its entire peripheral edge by means of a step. According to the present invention, however, the raised region, at least adjacent to the connecting line, is essentially situated at the same level as the rest of the contact surface.

In a modification of the present invention, the lubrication groove is a lubricant distributing groove, which is connected on the one hand to at least two connection points for supplying lubricant and on the other hand, is connected via a passage to the actual lubrication duct system that supplies lubricant to the at least one rolling element track. Basically, however, it is also conceivable for the lubrication groove to be part of this lubricant duct system.

As has already been indicated above, the linear device can be a linear guide device. For example, it can be a rail guide in which the rod-shaped first functional unit is a guide rail and the second functional unit is a guide carriage. It can also be a rolling element bushing guide, for example a ball bushing guide in which the rod-shaped first functional unit comprises a round shaft and the second functional unit comprises a rolling element bushing. Finally, it can also be a spline shaft guide in which the rod-shaped first functional unit comprises a profiled shaft and the second functional unit comprises a rolling element bushing. However, it is also possible for the linear device to be a linear drive unit, for example a rolling element linear drive in which the rod-shaped first functional unit comprises a threaded spindle and the second functional unit comprises a rolling element nut.

The present invention also relates to a linear device with a first, essentially rod-shaped functional unit and a second functional unit that at least partially encompasses the rod-shaped functional unit; the two functional units can move in relation to each other by means of at least one endless rolling element track, which includes a load-bearing rolling element channel segment, a return channel segment, and two deflecting channel segments that connect the load-bearing rolling element channel segment and the return channel segment to each other; the second functional unit has a main body and at least one end plate unit, which rests with a contact surface against an end surface of the main body and contains a deflecting channel segment of the rolling element track; the end plate unit is comprised of a base part and an insert part, which includes the contact surface and rests with an additional contact surface against a counterpart contact surface of the base part; the insert part is provided with a lubrication groove, which is open toward the additional contact surface and extends at least partially in the circumference direction around the rod-shaped functional unit; and the end plate unit can be fastened to the main body by means of only two fastening elements and in that a region of the additional contact surface adjacent to the lubrication groove and encompassing this lubrication groove is raised in relation to the rest of the contact surface.

An exemplary embodiment of the present invention will be explained in greater detail below in conjunction with the accompanying drawings.

BRIEF DESCRIPTION OF THE DRAWINGS

FIG. 5 shows a perspective view of the insert part of the end plate unit according to FIG. 4, viewed from the direction V in FIG. 4.

DESCRIPTION OF THE PREFERRED EMBODIMENTS

Figure 1:
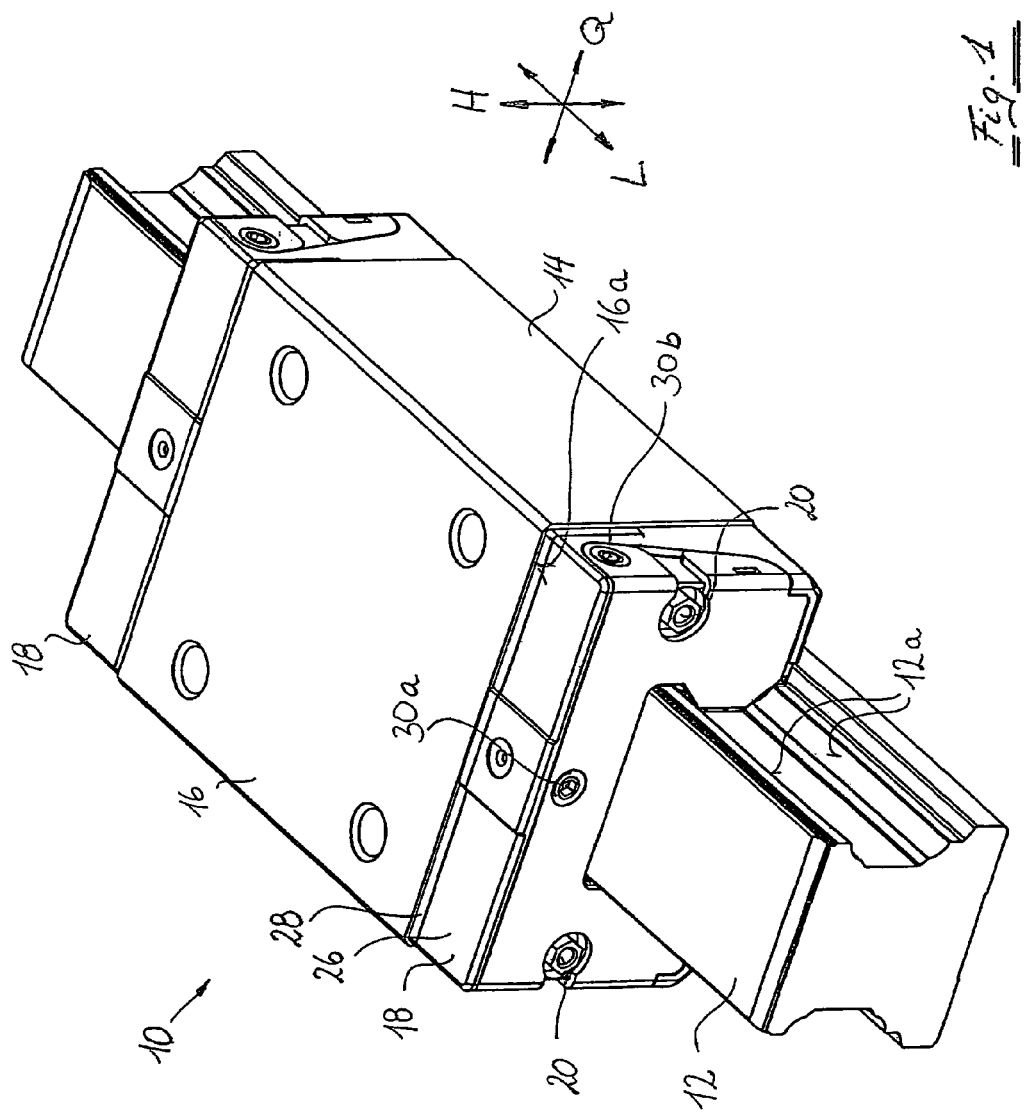
FIG. 1 shows a perspective view of a linear guide device according to the present invention.

In FIG. 1, a linear guide device according to the present invention is labeled as a whole with the reference numeral 10. It includes an elongated guide rail 12 extending in the longitudinal direction L and a guide carriage 14 that is guided on the guide rail 12 and can move in relation to it along its longitudinal axis L.

The guide carriage 14 has a main body 16 and two essentially identically embodied end plate units 18. Each of the two end plate units 18 is attached to the main body 16 of the guide carriage 14 by means of only two fastening screws 20.

In the exemplary embodiment depicted, the guide carriage 14 contains four endless rolling element tracks 22 (see FIG. 2), each of which includes a load-bearing rolling element channel segment, a return channel segment, and two deflecting channel segments that connect the load-bearing rolling element channel segment and the return channel segment to each other. The load-bearing rolling element channel segment here is comprised of a load-bearing rolling element raceway 22a on the guide carriage and a load-bearing rolling element raceway 12a on the guide rail (see FIG. 1). The deflecting channel segments 18a extend according to FIG. 2 between the two openings 18b and 18c of the end plate unit 18. The return channel segments 22b are only indicated with dot-and-dash lines in FIG. 2, as are the rolling elements 24 that travel in an endless succession around the rolling element tracks 22.

Figure 2:
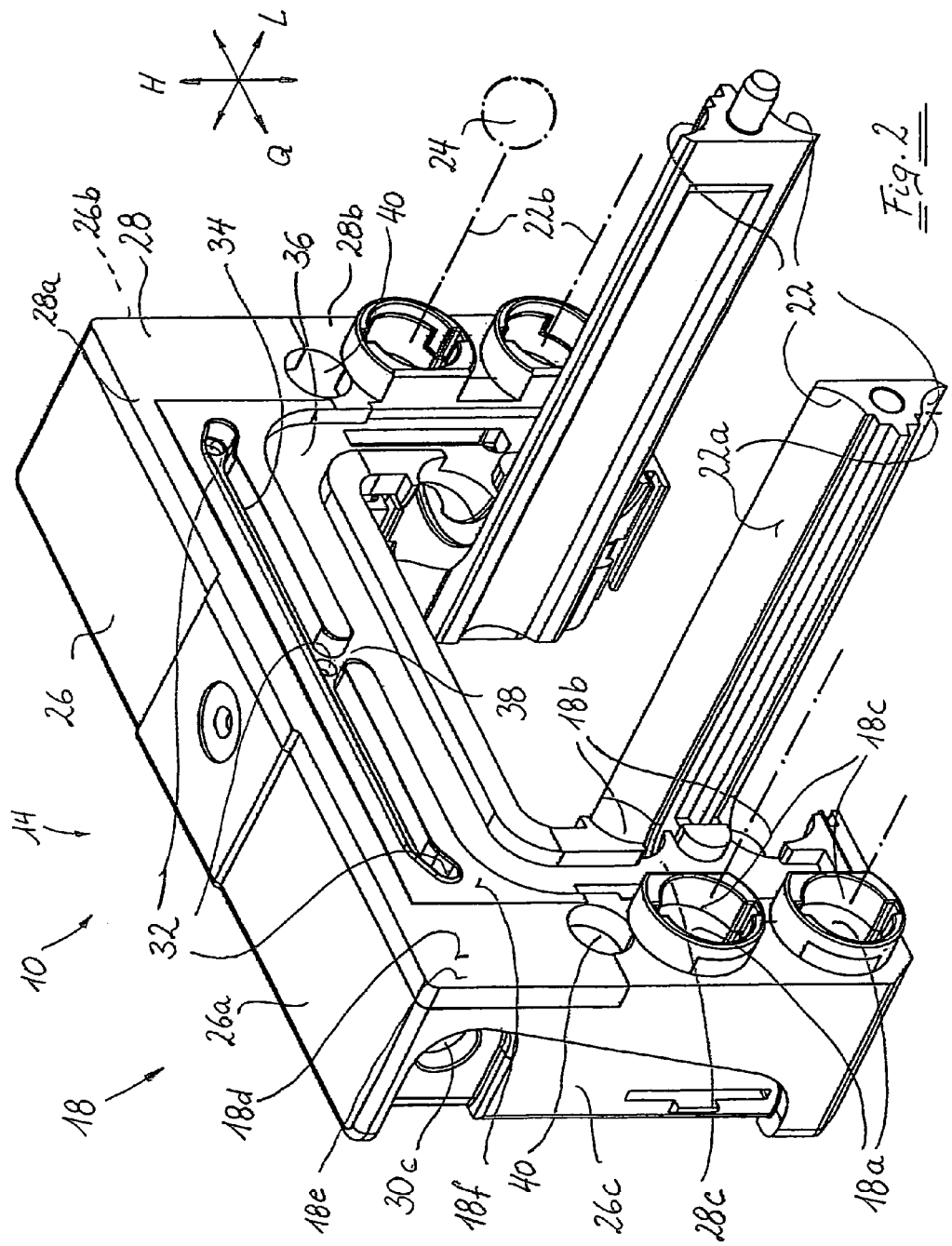
FIG. 2 shows a perspective view of an end plate unit of the linear guide unit according to FIG. 1.
Figure 3:
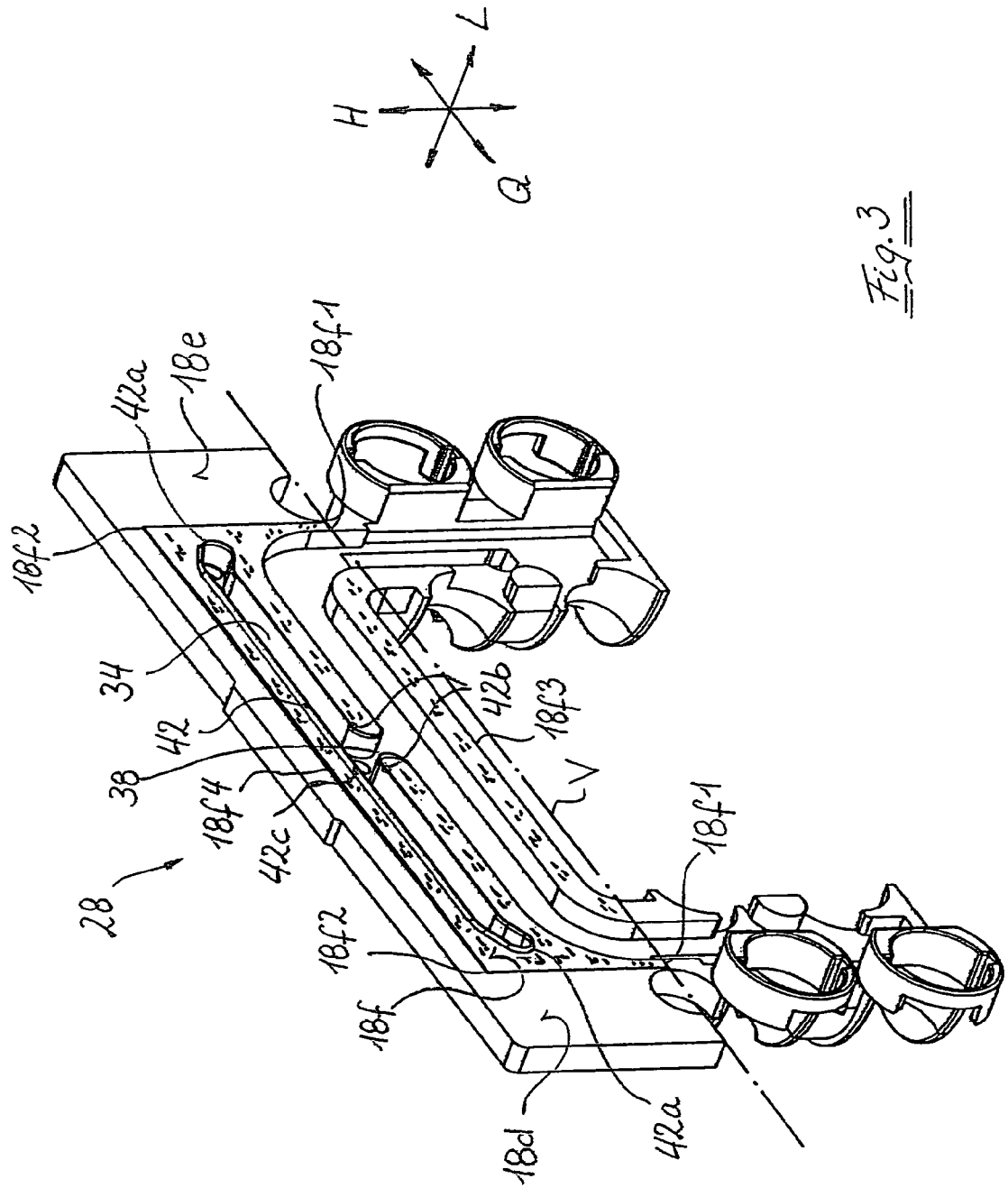
FIG. 3 shows a perspective view of an insert part of the end plate unit according to FIG. 2.

As is also shown in FIG. 2, the end plate unit 18 has a base part 26 and an insert part 28 that are both preferably made of plastic. For example, the base part 26 is made of the relatively rigid plastic polyoxymethylene (POM) and the insert part 28 is made of the relatively softer plastic Hytrel, preferably both in the form of injection molded parts. FIG. 3 shows the insert part 28 again, separately.

The base part 26 of the end plate unit 18 is provided with three connection points 30a, 30b, 30c for supplying lubricant, a first 30a and a second 30b of which are depicted in FIG. 1 and a third 30c of which is depicted in FIG. 3. Line segments, not shown, in the base part 26 and openings 32 in the insert part 28 convey the lubricant to a lubricant distributing groove 34 that is connected via a central through opening 38 to a lubricant duct system 36, which supplies the lubricant to the rolling element tracks 22 in order to lubricate the rolling elements 24 contained therein. This assures that the lubricant is distributed evenly to all four roller element tracks 22, regardless of whether it is supplied via the central connection point 30a or via one of the lateral connection points 30b, 30c. Although this is not shown in FIGS. 2 and 3, a wick element can also be provided in the lubrication duct 36, which counteracts a for example gravity-induced uneven distribution of the lubricant between the upper and lower roller element tracks 22.

According to FIG. 2, both the base part 26 and the insert part 28 of the end plate unit 18 are essentially U-shaped, with a base 26a or 28a of the U-shape extending essentially in the transverse direction Q and two U-legs 26b, 26c or 28b, 28c extending freely, essentially in the vertical direction H. With this U-shape, the guide carriage 14 encompasses the guide rail 12 around part of its circumference. In the exemplary embodiment depicted, the lubricant distributing groove 34 extends essentially in the transverse direction Q and therefore in the circumference direction around the guide rail 12.

When the end plate unit 18 is mounted onto the main body 16 of the guide carriage 14, the contact surface 18*d* of the end plate unit 18 rests against a corresponding counterpart contact surface 16*a* of the main body 16. Then the fastening screws 20 are inserted through the openings 40 and screwed to the main body 16 of the guide carriage 14. This presses the contact surface 18*d* firmly against the counterpart contact surface 16*a* of the main body 16.

In order to be able to prevent lubricant from escaping from the lubrication groove 34, the contact surface 18*d* on the insert part 28 of the end plate unit 18 immediately adjacent to the lubricant distributing groove 34 has a surface region 18*f* that is raised in relation to the rest of the contact surface 18*e*. In the exemplary embodiment shown, this raised surface region 18*f* is embodied essentially in the form of a ramp. In the vicinity of the connecting line V of the openings 40 for the two fastening screws 20, i.e. in the region of the two locations labeled 18/1 in FIG. 3, the raised surface region 18*f* is still essentially at the same level as the rest of the contact surface 18*e*, i.e. the surface region 18*e* of the contact surface 18*d* not occupied by the raised surface region 18*f*, extending essentially in a plane and essentially orthogonal to the longitudinal direction L. From there, the raised surface region 18*f* then rises in the vertical direction H until it reaches the points labeled 18/2 in FIG. 3 at the upper corners. In this location, the raised surface region 18*f* has a first predetermined superelevation, which can be 0.1 mm for example, in relation to the rest of the contact surface 18*e*. The edge of the raised surface region 18/2 between the points 18/1 and 18/2 can extend either in a straight line or in a curve, for example in a convex fashion.

The height of the raised surface region 18*f* also increases in the transverse direction Q. in fact, the superelevation in relation to the rest of the contact surface 18*e* essentially in the middle between the two points 18/1, i.e. approximately at the point labeled 18/3 in FIG. 3, reaches a second predetermined value that can be 0.15 mm, for example. Approximately in the region of the midpoint between the two points 18/2, i.e. at the location labeled 18/4 in FIG. 3, the superelevation can even reach a third predetermined value that can be 0.35 mm, for example. It is also possible for the increases from the points 18/1 to the point 18/3 and from the points 18/2 to the point 18/4 to extend in a straight line or in a curve, for example in a convexly curved fashion.

It should also be noted that the edge of the raised surface region 18*f* between the points 18/1 and 18/2 and between the two points 18/2 is embodied as abruptly stepped, i.e. the transition between the raised surface region 18*f* and the rest of the contact surface 18*d* is essentially discontinuous.

If the fastening screws 20 now press the contact surface 18*d* of the end plate unit 18 against the counterpart contact surface 16*a* of the main body 16 of the guide carriage 14, then first, the raised surface region 18*f* comes into contact with the counterpart contact surface 16*a* and then with further tightening of the fastening screws 20, pressure is generated between the end plate unit 18 and the main body 16 of the guide carriage 14. Since the raised surface region 18*f* directly encompasses the lubrication groove 34, the softness of its plastic material causes it to function as an elastic sealing element that prevents lubricant from escaping from the lubrication groove 34.

If this sealing action due to the compression of the softer material of the raised surface region 18*f* is insufficient, then, as shown in FIGS. 2 and 3, the lubrication groove 34 can also be encompassed by a sealing lip 42, which is preferably situated directly at the edge of the lubrication groove 34 and protrudes from the raised surface region 18*f* in the direction toward the main body 16 of the guide carriage 14. This sealing lip 42 can either have a constant height over its entire span or can rise from its segments 42*a* on the outside in the transverse direction Q to its inner segments 42*b* adjoining the through opening 38 and its inner segment 42*c* adjacent to the through opening 38, which results in an even further superelevation.

It should also be noted that by contrast with the depiction according to FIG. 2, the raised surface region 18*f* in FIG. 3 is raised even further by the stippled surface with which is provided.

Figure 4:
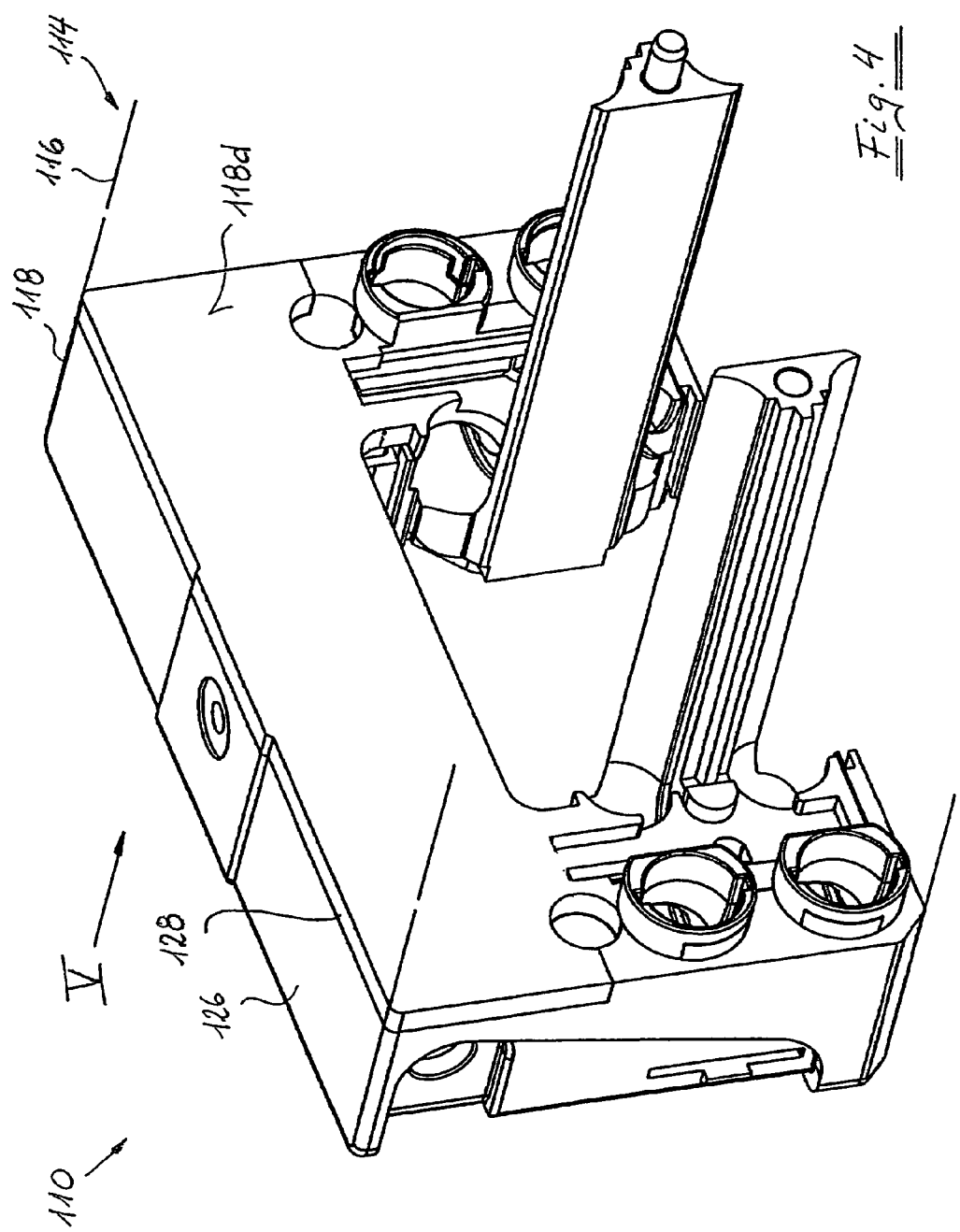
FIG. 4 shows a perspective view of a second embodiment form of an end plate unit embodied according to the present invention.

FIGS. 4 and 5 show another embodiment form of a linear device according to the present invention, many parts of which correspond to those in the embodiment form explained above. For this reason, analogous parts in FIGS. 4 and 5 have been provided with reference numerals that are the same as those in FIGS. 1 through 3, but increased by 100. Furthermore, the embodiment form according to FIGS. 4 and 5 will only be described below insofar as it differs from the embodiment form according to FIGS. 1 through 3, the remaining description of which is expressly included herein by reference.

In the linear device 110 according to FIGS. 4 and 5 as well, the guide carriage 114 is comprised of a main body 116 (only shown with dashed lines in FIG. 4) and two end plate units 118, only one of which is depicted in FIG. 4. The end plate unit 118 is also comprised of a base part 126 and an insert part 128. The insert part 128 is provided with the contact surface 118*d* with which the end plate unit 118 contacts the main body 116 of the guide carriage 114. As depicted in FIG. 4, this contact surface 118*d* is embodied as essentially planar and consequently rests with its entire surface against the end surface of the main body 116.

As is clearly evident from a comparison of FIGS. 3 and 5, FIG. 5 shows a rear view of the insert part 128 of the end plate unit 118 shown in FIG. 4, i.e. a view from the direction of the arrow V in FIG. 4. The main difference between the insert part 28 according to FIG. 3 and the insert part 128 according to FIG. 5 is that the lubrication groove 134 is not embodied in the contact surface 118*d* (see FIG. 4), but in the additional contact surface 128*d* oriented away from it, with which the insert part 128 rests against the counterpart contact surface of the base part 126.

In order to be able to prevent an escape of lubricant from the lubrication groove 134, the additional contact surface 128*d* immediately adjacent to the lubrication groove 134 has a surface region 128*f* that is raised in relation to the rest of the contact surface 128*e*. With regard to the ramp-like embodiment of this raised surface region 128*f*, the additional provision of a sealing lip 142 directly encompassing the lubrication groove 134, the material selection for the insert part 128 and the base part 126, and other features of the raised surface region 128*f*, reference is hereby made to the preceding description of the embodiment form according to FIGS. 2 and 3.

When the end plate unit 118 is fastened to the main body 116 of the guide carriage 114 by means of fastening screws inserted through the openings 140, the entire surface of the contact surface 118*d* comes into contact with the end surface of the main body 116, which presses the additional contact surface 128*d* and in particular, its raised surface region 128*f* into contact with the counterpart contact surface of the base part 126 of the end plate unit 118. This compresses the raised surface region 128*f*, which seals the entire apparatus against an undesired escape of lubricant from the lubrication groove 134.

In an overabundance of caution, it should also be noted that the idea underlying the present invention can be advantageously put to use not only in a rail guide in which the rod-shaped first functional unit is a guide rod and the second functional unit is a guide carriage, but also in other types of linear guide devices or linear drive units such as a rolling element bushing guide, for example a ball bushing guide, in which the rod-shaped first functional unit is a round shaft and the second functional unit is a rolling element bushing; a spline shaft guide in which the rod-shaped first functional unit is a profiled shaft and the second functional unit is a rolling element bushing; or a rolling element linear drive in which the rod-shaped first functional unit is a threaded spindle and the second functional unit is a rolling element nut.

It will be understood that each of the elements described above, or two or more together, may also find a useful application in other types of constructions differing from the types described above.

While the invention has been illustrated and described as embodied in a linear device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A linear device, comprising a first substantially rod-shaped functional unit; a second functional unit that at least partially encompasses said first functional unit, said functional units being movable relative to one another; at least one endless rolling element track for moving said functional units relative to one another, said at least one endless rolling element track including a load-bearing rolling element channel segment, a return channel segment, and two deflecting channel segments that connect said load-bearing rolling element channel segment and said return channel segment to each other, said second functional unit having a main body and at least one end plate unit which rests with a contact surface against an end surface of said main body and contains one of said deflecting channel segments of said rolling element track, said end plate unit being provided with a lubrication groove which is open toward said contact surface and extends essentially in a transverse direction, which is orthogonal to both a vertical direction and a longitudinal direction of the first functional unit, and therefore extends at least partially in a circumferential direction around said first functional unit, said end plate unit being fastenable to said main body by only two fastening elements, and a region of said contact surface adjacent to said lubrication groove and encompassing said lubrication groove being raised in relation to a rest of said contact surface, wherein said end plate unit has a base part and an insert part that includes said contact surface, and wherein said lubrication groove is a lubricant distributing groove, which is connected to at least two connecting points for supplying lubricant to the lubricant distributing groove and which is also connected via a single, central through opening in the center of the lubricating groove between said at least two connecting points to a lubrication duct system, which supplies lubricant from the single, central through opening to the rolling element track, and
wherein the single, central through opening extends in a vertical direction and is centrally arranged in the transverse direction in the center of the lubricant distributing groove.

2. A linear device as recited in claim 1, wherein said insert part is composed of a material that is softer than said base part.

3. A linear device as defined in claim 2, wherein said insert part is composed of plastic.

4. A linear device as defined in claim 1, further comprising a sealing lip which at least partially encompasses said lubrication groove.

5. A linear device as defined in claim 4, wherein a height of said sealing lip above said raised region extends in a convex fashion in a direction extending substantially parallel to a connecting line between said fastening elements.

6. A linear device as defined in claim 1, wherein said region that is raised in relation to the rest of the contact surface is substantially ramp-shaped, rising from the contact surface a raised distance that increases in a vertical direction extending from a connecting line between said fastening elements to an edge of said end plate.

7. A linear device as defined in claim 6, wherein the distance of said raised region from the rest of said contact surface increases in the direction extending from said connecting line between said fastening elements to said edge of said end plates orthogonal to said connecting line.

8. A linear device as defined in claim 1, wherein said raised region extends in a convex fashion in a direction extending substantially parallel to a connecting line between said fastening elements.

9. A linear device as defined in claim 1, wherein said raised region, at least adjacent to a connecting line between said fastening elements, is substantially situated at a same level as the rest of said contact surface.

10. A linear device as defined in claim 1, wherein the linear device is configured as a linear guide device.

11. A linear device as defined in claim 10, wherein said linear guide device is configured as a rail guide, said first functional unit comprising a guide rail and said second functional unit comprising a guide carriage.

12. A linear device as defined in claim 10, wherein said linear guide device is configured as a rolling element bushing guide, said first functional unit comprising a round shaft and said second functional unit comprising a rolling element bushing.

13. A linear device as defined in claim 10, wherein said linear guide device is configured as a spline shaft guide, said first functional unit comprising a profiled shaft and said second functional unit comprising a rolling element bushing.

14. A linear device as defined in claim 1, wherein the linear device is configured as a linear drive device.

15. A linear device as defined in claim 14, wherein said linear drive device is configured as a roller element linear drive unit, said first functional unit comprising a threaded spindle and said second functional unit comprising a rolling element nut.

16. A linear device, comprising a first substantially rod-shaped functional unit; a second functional unit that at least partially encompasses said first substantially rod-shaped functional unit, said functional units being movable relative to one another; at least one endless rolling element track for moving said functional units relative to one another, said at least one endless rolling element track including a load-bearing rolling element channel segment, a return channel segment, and two deflecting channel segments that connect said load-bearing rolling element channel segment and said return channel segment with one another, said second functional unit having a main body and at least one end plate unit which rests with a contact surface against an end surface of said main body and contains one of said deflecting channel segments of said rolling element track, said end plate unit comprising a base part and an insert part which includes said contact surface and rests with an additional contact surface against a counterpart contact surface of said base part, said insert part being provided with a lubrication groove which is open toward said additional contact surface and extends essentially in a transverse direction, which is orthogonal to both a vertical direction and a longitudinal direction of the first functional unit, and therefore extends at least partially in a circumferential direction around said first functional unit, said end plate unit being fastenable to said main body by only two fastening elements, and a region of said additional contact surface adjacent to said lubrication groove and encompassing said lubrication groove being raised relative to a rest of said additional contact surface, wherein said lubrication groove is a lubricant distributing groove, which is connected to at least two connecting points for supplying lubricant to the lubricant distributing groove and which is also connected via a single, central through opening in the center of the lubricating groove between said at least two connecting points to a lubrication duct system, which supplies lubricant from the single, central through opening to the rolling element track, and wherein the single, central through opening extends in a vertical direction and is centrally arranged in the transverse direction in the center of the lubricant distributing groove.

17. A linear device as recited in claim 16, wherein said insert part is composed of a material that is softer than said base part.

18. A linear device as defined in claim 17, wherein said insert part is composed of plastic.

19. A linear device as defined in claim 16; and further comprising a sealing lip which at least partially encompasses said lubrication groove.

20. A linear device as defined in claim 19, wherein a height of said sealing lip above said raised region extends in a convex fashion in a direction extending substantially parallel to a connecting line between said fastening elements.

21. A linear device as defined in claim 16, wherein said region that is raised in relation to the rest of the contact surface is substantially ramp-shaped, rising from the additional contact surface a raised distance that increases in a vertical direction extending from a connecting line between said fastening elements to an edge of said end plate.

22. A linear device as defined in claim 21, wherein the distance of said raised region from the rest of said additional contact surface increases in the direction extending from said connecting line between said fastening elements to said edge of said end plates orthogonal to said connecting line.

23. A linear device as defined in claim 16, wherein said raised region extends in a convex fashion in a direction extending substantially parallel to a connecting line between said fastening elements.

24. A linear device as defined in claim 16, wherein said raised region, at least adjacent to a connecting line between said fastening elements, is substantially situated at a same level as the rest of said additional contact surface.

25. A linear device as defined in claim 16, wherein the linear device is configured as a linear guide device.

26. A linear device as defined in claim 25, wherein said linear guide device is configured as a rail guide, said first functional unit comprising a guide rail and said second functional unit comprising a guide carriage.

27. A linear guide device as defined in claim 25, wherein said linear guide device is configured as a rolling element bushing guide, said first functional unit comprising a round shaft and second functional unit comprising a rolling element bushing.

28. A linear device as defined in claim 25, wherein said linear guide device is configured as a spline shaft guide, said first functional unit comprising a profiled shaft and second functional unit comprising a rolling element bushing.

29. A linear device as defined in claim 16, wherein the linear device is configured as a linear drive device.

30. A linear device as defined in claim 29, wherein said linear drive device is configured as a roller element linear drive unit, said first functional unit comprising a threaded spindle and said second functional unit comprising a rolling element nut.

31. A linear device, comprising a first substantially rod-shaped functional unit; a second functional unit that at least partially encompasses said first substantially rod-shaped functional unit, said functional units being movable relative to one another; at least one endless rolling element track for moving said functional units relative to one another, said at least one endless rolling element track including a load-bearing rolling element channel segment, a return channel segment, and two deflecting channel segments that connect said load-bearing rolling element channel segment and said return channel segment with one another, said second functional unit having a main body and at least one end plate unit which rests with a contact surface against an end surface of said main body and contains one of said deflecting channel segments of said rolling element track, said end plate unit provided with a lubrication groove which is open towards said contact surface and extends essentially in a transverse direction, which is orthogonal to both a vertical direction and a longitudinal direction of the first functional unit, and therefore extends at least partially in a circumferential direction around said first functional unit, said end plate unit being fastenable to said main body by only two fastening elements, wherein said end plate unit has a base part and an insert part that includes said contact surface, and wherein said lubrication groove is a lubricant distributing groove, which is connected to at least two connecting points for supplying lubricant to the lubricant distributing groove and which is also connected via a single, central through opening to a lubrication duct system which supplies lubricant from the single, central through opening to the rolling element track, wherein the linear device further comprises a sealing lip which at least partially encompasses said lubrication groove and wherein a height of said sealing lip increases over its length in a convex fashion as said sealing lip extends in a direction substantially parallel to a connecting line between said fastening elements.

* * * * *